Jan. 5, 1965   J. P. BEAUDOIN   3,164,293
APPARATUS FOR STACKING STICKS AND LIKE ARTICLES
Filed July 2, 1962   3 Sheets-Sheet 1
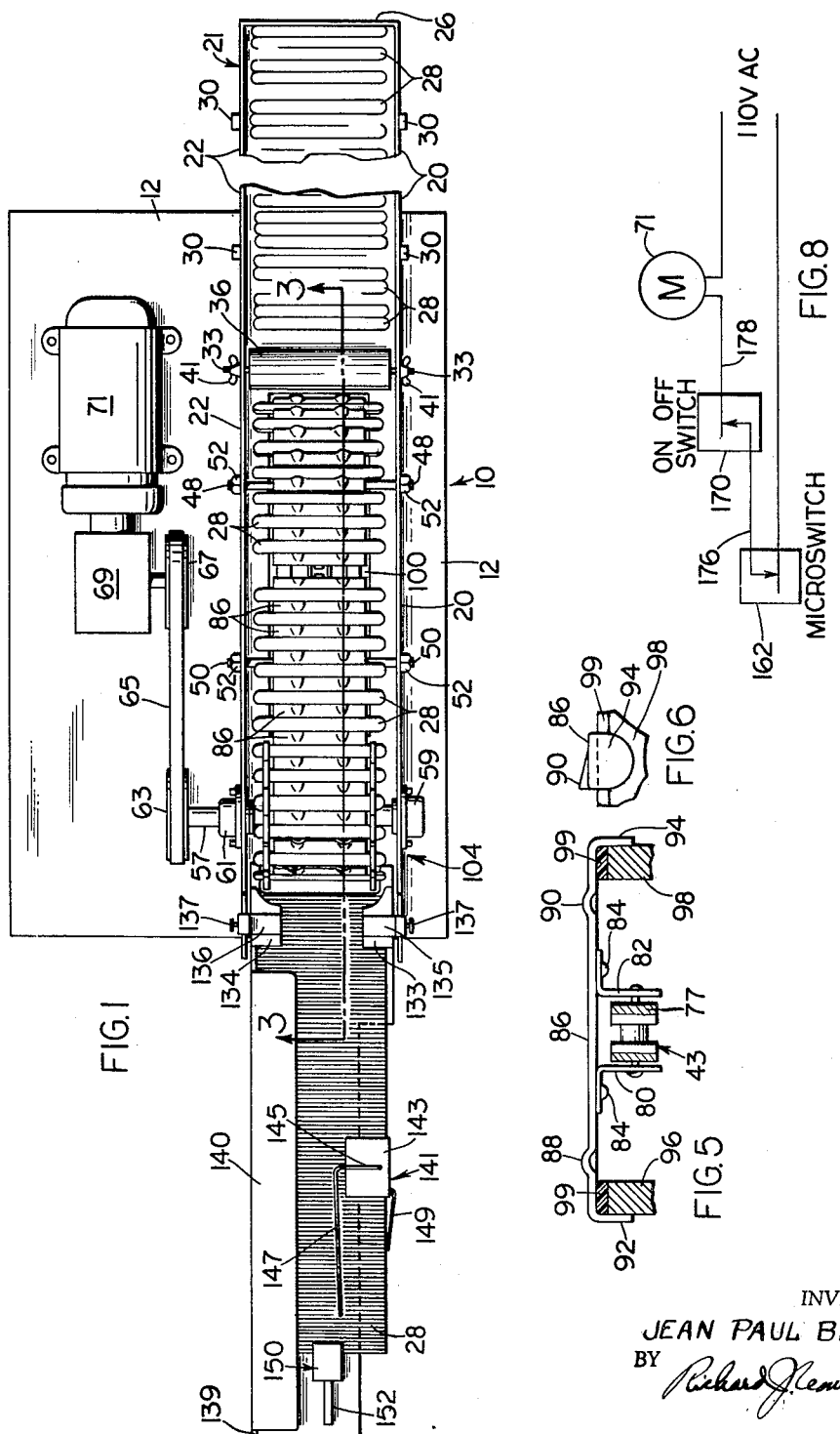
INVENTOR.
JEAN PAUL BEAUDOIN
BY Richard J. Newling
ATTORNEY

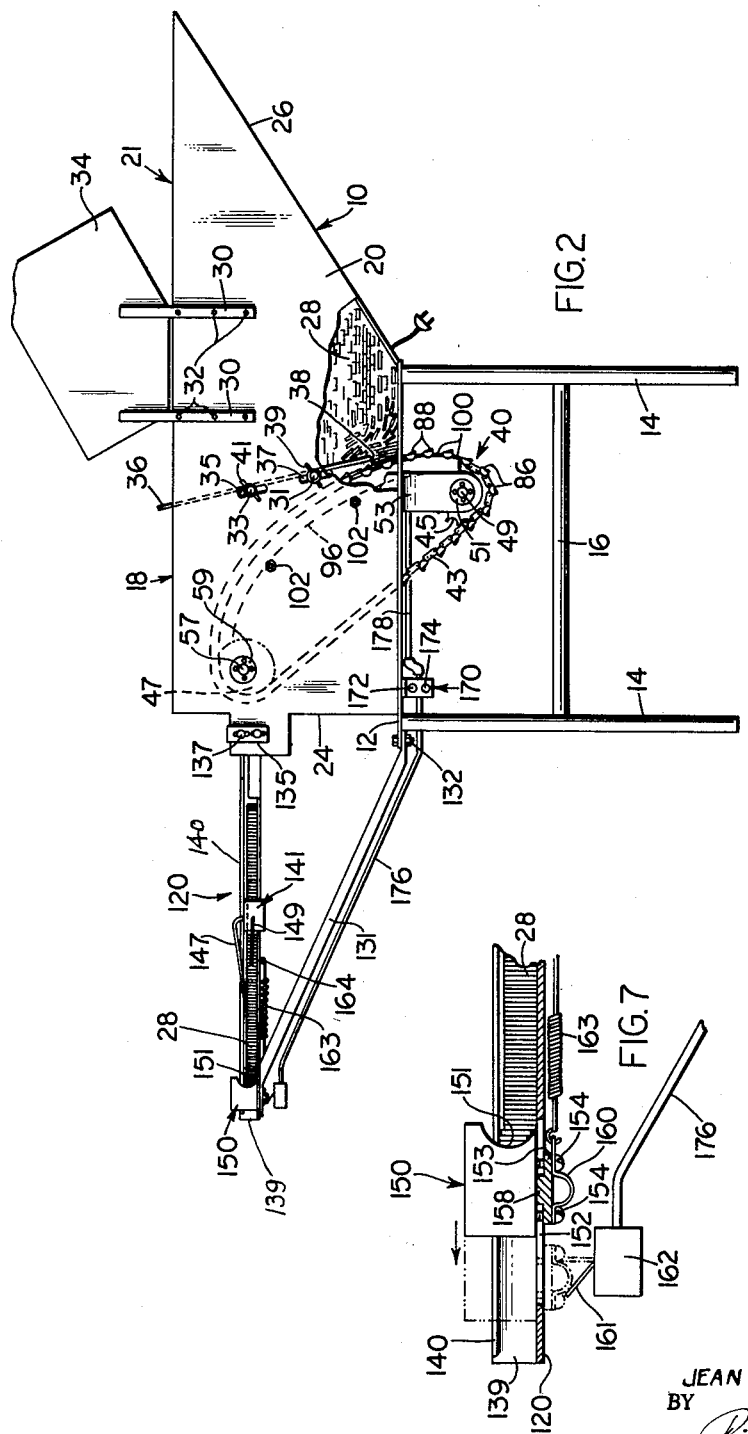

Jan. 5, 1965  J. P. BEAUDOIN  3,164,293
APPARATUS FOR STACKING STICKS AND LIKE ARTICLES
Filed July 2, 1962  3 Sheets-Sheet 3

INVENTOR.
JEAN PAUL BEAUDOIN
BY
ATTORNEY

United States Patent Office 3,164,293
Patented Jan. 5, 1965

3,164,293
APPARATUS FOR STACKING STICKS AND LIKE ARTICLES
Jean Paul Beaudoin, Grand Mere, Quebec, Canada, assignor to Joe Lowe Corporation, New York, N.Y., a corporation of Delaware
Filed July 2, 1962, Ser. No. 206,929
3 Claims. (Cl. 221—13)

The present invention relates generally to the art of arranging articles, and it has specific relation to an apparatus for the stacking of flat, elongated, handle sticks on one edge in a row back-to-back, whereby a quantity of them may be removed for banding or insertion in a stick inserting machine of the type used generally for loading stickholders or stick inserters of the kind used in making frozen stick confections.

Handle sticks of the type used in the manufacture of frozen stick confections are delivered generally from the stick factory in relatively large cartons, having thousands of sticks arranged roughly in parallel relationship, the cartons having a thickness substantially the length of said sticks so that in shipping they do not become rearranged in a helter skelter fashion.

Heretofore, there have been several types of machines for arranging such sticks from a carton into a single longitudinal row back-to-back by means of a rotating slotted drum, which selected sticks from a hopper and stacked them in a row from which they could be banded or removed in relatively small stacked groups, but such machines have never been successful commercially because of their cost and the difficulties encountered with warped or thick sticks. Such sticks had a tendency to jam in these machines or failed to stay in their respective slots.

With the present invention all of the aforesaid disadvantages have been obviated, and an apparatus has been developed which is simple, inexpensive, substantially fool-proof and capable of selecting and holding sticks taken from the supply hopper for delivery to the stacking trackway.

An object of the present invention is to provide an apparatus of the character described, which is extremely simple, efficient and inexpensive to manufacture.

Another object of the invention is to provide a simple, practical, rugged and durable apparatus in which the processed sticks are always exposed for removal in the event a warped or off-sized stick is contained in the supply being processed.

A further object of the invention is the provision of an apparatus which is extremely simple and inexpensive to operate and which does not require the constant attention of an operator.

Another object of the invention is the provision of an apparatus which permits the gravity feeding of the sticks from a supply hopper to a delivery device capable of selecting only one stick at a time and holding it securely until it reaches a transfer device, which deposits said sticks in a stacked relationship on a stacking track.

A further object of the invention is to provide simple, inexpensive and efficient means for stopping the apparatus when its stacking track is filled with sticks stacked back-to-back.

Another object of the invention is the provision of simple, inexpensive and efficient means for restarting the apparatus each time a quantity of stacked sticks is removed from its stacking track.

Other and further objects and advantages of the invention reside in the detailed construction of the apparatus, which result in simplicity, economy and efficiency, and which will be apparent from the following description, wherein a preferred embodiment is shown, reference being had to the accompanying drawings, forming a part hereof, wherein like numerals indicate like parts in which:

FIGURE 1 is a fragmentary top plan view of an apparatus embodying the principles of the invention;

FIGURE 2 is a side elevational view of the apparatus shown in FIGURE 1, but on a slightly smaller scale;

FIGURE 5 is a cross-sectional view of the delivery device showing the construction of a flight bar thereof, the same having been taken substantially along the line 5—5 of FIGURE 3, looking in the direction of the arrows;

FIGURE 6 is an end elevational view of the flight bar shown in FIGURE 5;

FIGURE 7 is an enlarged fragmentary view of the reciprocating carriage for stopping the apparatus when the stacking trackway is filled with sticks, and for restarting the apparatus when a quantity of sticks has been removed from said trackway; and FIGURE 8 is a schematic wiring diagram showing the electric circuit for starting and/or stopping the apparatus.

Figure 4:
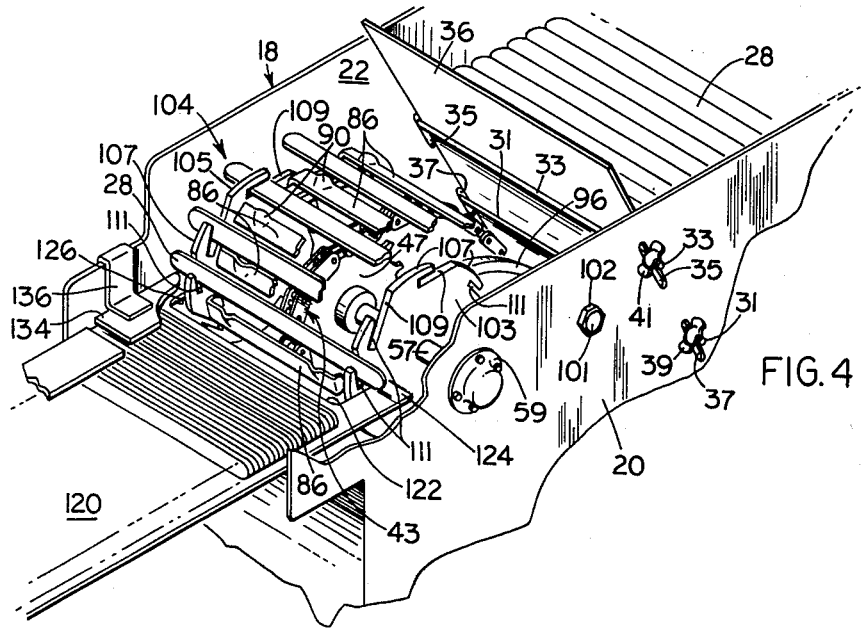
FIGURE 4 is a fragmentary perspective view of the apparatus, showing the transfer device for transferring sticks from the delivery device onto a stacking track, the view being on a larger scale.

Referring now to the drawings and particularly to FIGURE 2, there is shown an apparatus 10 of the character described, having a structural supporting platform 12 provided with spaced legs 14 and suitable reinforcing structural braces 16. Mounted on the top of said supporting platform 12 is a relatively narrow elongated open top housing 18, having upstanding sidewalls 20 and 22 and end walls 24 and 26. It will be noted that the back end wall 26 slopes downwardly towards the bottom, which is the top of the supporting platform 12. The sides of the housing 18 have four spaced upstanding brackets 30 fixedly mounted thereon, as by spot welding 32, for holding in an angular relationship to said housing a standard cardboard shipping carton 34 of the type used for shipping bulk flat sticks. Mounted forwardly of the sloping rear end wall 26 of the housing 18 and between the sidewalls 20 and 22 is a movable division plate or baffle 36, which serves to cut-off or subdivide the rear end of the housing 18 into a hopper 21 for holding a quantity of handle sticks 28. It will be noted the baffle plate 36 is mounted on a rearwardly declining angle to facilitate the gravitational movement of the handle sticks 28 in the hopper, and that it does not extend entirely to the bottom 12, but stops short thereof to provide an elongated slot or opening 38 extending across the bottom of said hopper 21 for sticks 28 to be gravitated forwardly and outwardly therefrom into a pick-up station. The baffle plate 36 is mounted adjustably between the sidewalls 20 and 22 by means of spaced rods 31 and 33, which are welded to the outer or forward side of the plate 36, and project transversely therefrom along opposite sides through pairs of aligned slots 35 and 37 in the side walls 20 and 22. The outer projecting free ends of the rods 31 and 33 are threaded for receiving wing nuts 39 and 41. When the wing nuts 39 and 41 are tightened threadingly on the rods 31 and 33, they frictionally clamp the plate 36 in any fixed position between the sidewalls 20 and 22 within the limits of the slots 35 and 37. The position of the baffle plate 36 determines the height of the elongated bottom slot 38, which leads from the hopper 21 into the pick-up station. The lower the height of the slot 38, the less overcarry of extra sticks 28 on the delivery conveyor, which extra sticks must keep dropping back into the pick-up station. If too many sticks 28 get on the wrong side of the plate 36, some will be carried up the delivery device 40 notwithstanding the protuberances 88 and 90. These sticks must be removed by hand. Different sticks have different surfaces, and, some tend to stick together more than others, which means there will be at times a greater tendency for sticks to ride up on the delivery device 40.

The delivery device 40 consists of a single chain 43 mounted over spaced sprocket wheels 45 and 47. It will be noted the sprocket wheel 45 is mounted freely on a shaft 49, which extends transversely of the housing 18 below the discharge opening 38 in the hopper 21. The shaft 49 is journalled in bearings 51 suitably mounted on spaced brackets 53 and 55 suspended from the platform 12. The sprocket wheel 47 is keyed on a shaft 57, as indicated at 58, which extends transversely of the housing 18 adjacent the top and forward end thereof. The shaft 57 is suitably journalled in bearing bracket members 59 and 61 mounted on opposite sides of the housing 18. It will be noted that the shaft 57 projects through and beyond its bearing member 61, and has a pulley wheel 63 keyed to the outer end thereof. The pulley wheel 63 engages an endless belt 65 whose opposite end is mounted over a driving pulley 67 of a conventional gear reduction unit 69, which, in turn, is driven by an electric motor 71.

Figure 3:
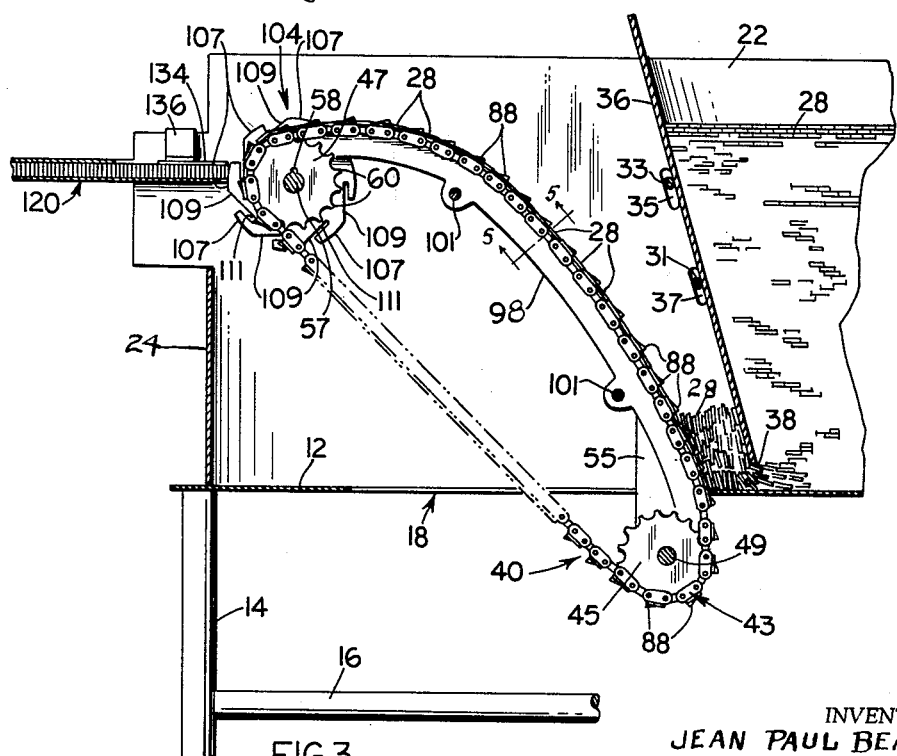
FIGURE 3 is a fragmentary side sectional view of the apparatus shown in FIGURE 1, the same having been taken substantially along the line 3—3 thereof, looking in the direction of the arrows.

Referring now to FIGURES 5 and 6, the drive chain 43 of the delivery device 40 has mounted invertedly on each link 77 a pair of L-shaped supporting brackets 80 and 82. Mounted transversely of the chain 43 on each pair of brackets 80 and 82 by means of machine screws 84 is an elongated narrow flight bar 86. Each of the flight bars 86 has means in the form of spaced raised protuberances or nobs 88 and 90, which are of a height slightly greater than the thickness of a stick. The outer ends of the flight bars 86 are bent downwardly forming depending end flanges 92 and 94. The end flanges 92 and 94 are adapted to slidably engage spaced guide rails 96 and 98. The tops of each of the guide rails 96 and 98 are covered with a suitable replaceable plastic material 99, as for example nylon, Teflon, etc. for reducing the frictional resistance and wear. The guide rails 96 and 98 are suitably supported by bolts 101 secured by nuts 102 extending through the sidewalls 20 and 22 of the housing 18. The flight bars 86 are spaced longitudinally on the chain 43 a distance slightly greater than the width of a handle stick 28, and the spaces between adjacent flight bars 86 form pockets or slots 100, each capable of receiving one handle stick as it is moved through the pick-up station, which contains a quantity of loose sticks 28 being discharged through the slot 38 of said hopper 21, as best shown in FIGURE 3. The raised protuberances 88 and 90, which are slightly higher than the thickness of a handle stick 28, function due to the arc of the chain 43 at the stick pick-up station to prevent the lodging of more than one stick to a slot 100 by pushing the loose extra sticks away from the flight bars 86, whereby they may gravitate back onto the pile at the pick-up station. The handle sticks 28 carried by the chain 43 between the spaced flight bars 86 are now delivered to a transfer device 104.

The transfer device 104 consists of a pair of spaced wheels 103 and 105 mounted transversely of the housing 18 on the shaft 57, the spacing of said wheels being less than the length of said handle sticks 28 and greater than the length of said flight bars 86. Each wheel 103 and 105 has, as best shown in FIGURES 3 and 4, a series of arcuate segments 107, having a straight section 109, which extends forwardly to form a recess 111 under the adjacent forward arcuate segment 107. The recesses 111 are open at the peripheries of the spaced wheels 103 and 105 and are correspondingly spaced in suitable transverse alignment. The recesses 111 extend inwardly of the wheels 103 and 105 and under the adjacent forward arcuate segment 107 for a distance substantially equal to the width of a handle stick, and such recesses have a height measured substantially radially that is just slightly greater than the thickness of a handle stick. Thus, when a handle stick 28 is picked up by the aligned pair of slots 109 in the wheels 103 and 105, it tends to slide back as the wheels rotate forwardly into the recess 111 where it is held for discharge. There are two teeth 60 on the sprocket wheel 47 to each arcuate section 107, which includes said straight section 109 and said slotted section 111 of the spaced wheels 103 and 105.

Referring again to FIGURES 3 and 4, it will be noted that the inner end of the stacking trackway 120 is recessed centrally, as indicated at 122, to receive the spaced wheels 103 and 105 and has spaced siderails 124 and 126 flanking said wheels. When the aligned recesses 111 of the spaced wheels 103 and 105 reach their discharge position with their handle stick 28 in the plane of said trackway 120, the siderails 124 and 126 force the stick therefrom and support it in a horizontal plane for stacking back-to-back on their respective bottom edges with the preceding sticks. The arcuate segments 107 of each of the spaced wheels 103 and 105 serve to engage the previously deposited stick on said trackway to move it forwardly thereon and out of the way of the next succeeding stick to be deposited on said trackway.

The stacking trackway 120 extends forwardly for a substantial distance for holding a relatively large quantity of stacked sticks. The outer end of the trackway 120 is supported by a bracket 131 which has one end mounted to the platform 12 by bolts 132.

Referring to FIGURES 1 and 4, it will be noted that a pair of spaced guides 133 and 134 extend parallel to and spaced above the stacking trackway 120. The guides 133 and 134 are mounted, as by welding, to supporting brackets 135 and 136, respectively. The brackets 135 and 136 are each mounted adjustably in vertically extending slots in the side of the housing 18 by means of a pair of vertically spaced threaded wing nuts 137. (See FIGURE 2.) Since each is adjustable separately, each may be raised and/or lowered independently into the best position for preventing the handle sticks 28 being discharged onto the stacking trackway 120 from bouncing out of position.

Mounted forwardly of the guide 134 and over the rear portion of the stacking trackway 120 is an angular housing member having a vertical flange 139 that forms a closed back for the trackway 120 and a horizontal flange 140 that projects over the stack of sticks 28 in the trackway 120 to form a top guide member, whereby the top edges of the stacked sticks 28 in the trackway 120 may be maintained in proper horizontal alignment. The trackway 120 is tilted slightly backward so that the back ends of the stacked sticks 28 will maintain contact with the closed back 139. An angular guide member 141, which has a horizontal top flange 143 that extends inwardly over the stacked sticks 28 is mounted intermediate the ends of the open side of the trackway 120. This guide member 141 has an L-shaped flexible spring wire member mounted on it by its short arm 145. The longer flexible wire arm 147 of the guide member 141 projects forwardly over and contiguous with the top edges of the stacked row of sticks, holding them on their edges in a horizontal plane. The guide member 141 has a second flexible spring wire guiding member 149 secured to its outer vertical side edge. This second wire member 149 is adapted to engage the free unprotected ends of the stacked row of sticks, forcing any that are out of alignment back into the stack against the closed back member 139. The wire member 149 makes certain the ends of the sticks are in proper alignment as they aproach a slidable carriage member 150.

The slidable carriage member 150 is mounted directly in the path of the stacked row of sticks adjacent the outer end of the stacking trackway 120. The carriage member 150 is a block having a concave recess 151 in its rear end into which the stacked row of sticks move until they abut its concaved inner end 151. The carriage member 150 is mounted over an elongated slot 152, and has a base plate 153 adapted to be secured thereto by screws 154. The base plate 153 has a medial rib 158 projecting upwardly therefrom, which has a height slightly greater than the thickness of the trackway 120. This rib 158 insures proper clearance and guide means for slidably mounting the carriage 150 in the slot 152 of the trackway 120. A downwardly projecting spring wire loop member 160 is also mounted under the base plate 153 by the screws 154. The loop member 160 serves to engage a spring tensioned projecting arm 161 of a conventional micro-switch 162 as its carriage member 150 is moved rearwardly of the trackway 120. The carriage member 150 has a spring tension means 163 connected to its rear end, which, in turn, has its opposite end connected to the underside of the trackway 120, as indicated at 164. This spring tension means 163 serves to maintain the carriage member 150 adjacent the rear end of the elongated slot 152 when there is an insufficient supply of stacked sticks 28 in the stacking trackway 120 to fill the same.

When the spring wire looped member 160 engages the spring tensioned switch arm 161 of the normally closed micro-switch 162 and moves it forwardly, the switch 162 will be opened, breaking the circuit and causing the motor 71 to stop. The projecting arm 161 of the micro-switch 162 is contacted slightly before the carriage member 150 reaches the end of its elongated slot 152 in order to allow for its further movement caused by the momentum of the motor 71 after its circuit is broken.

There is shown in FIGURE 8 a schematic wiring diagram for the apparatus wherein the motor 71 secures its source of electrical energy through a conventional manually operable switch 170, having suitable "on" and "off" buttons 172 and 174, respectively, which, in turn, is connected in series with the normally closed conventional micro-switch 162 through the conduit line 176. In this diagram both the switch 170 and micro-switch 162 are shown in their respective closed or "on" positions, and consequently the motor 71 will be running. The switch 170 is connected to an outside source of electrical energy (not shown), and to the motor 71 through the conduit line 178. When the switch 170 is opened or is in its "off" position, the circuit is broken and the apparatus cannot be operated. However, when the switch 170 is closed or is in its "on" position, the micro-switch 162 will be energized, being normally closed or "on." Now, the carriage 150 will be moved forwardly in its slot 152 by the advancing row of stacked sticks until its spring wire projecting loop 160 engages the arm 161 and moves it into its open or "off" position, whereupon the apparatus will come to a stop. The operator may now, while the motor 71 is shut-down, by means of a suitable clamp (not shown) secured over the projecting ends of the row of stacked sticks, manually remove a quantity contiguous to the forward end of the trackway 120. The spring wire members 147 and 149 will keep the remaining stacked sticks in alignment while a forward quantity is being removed and until the carriage 150 has been retracted into contact with the remaining sticks in the trackway 120. When a quantity of sticks has been removed from said trackway 120, the spring tension means 163 will cause the carriage member 150 to be retracted or drawn backwardly in its slot 152. When this happens, the projecting loop member 160 is withdrawn from contact with the spring arm 161 and it will then return to its normally closed position (which is shown by the dotted lines in FIGURE 7). Thereupon, the motor 71 will again start to operate and feed more sticks into the stacking trackway 120 until it becomes filled and the carriage 150 actuates the arm 161 of the micro-switch 162 to shut off the motor 71.

The operations of the apparatus and its several parts have been explained in detail in describing its several main parts so that it is not believed necessary to repeat such operations again. However, it is necessary to describe generally how the stacked handle sticks 28 are removed from the stacked row. An operator is provided with a metal clamp (not shown) having an elongated pair of opposed clamping jaws, which may be clamped over the projecting ends of the forward portion of the row of stacked sticks. The clamped sticks are pulled by said clamping jaws free of said stacked row, and are now ready to be banded in any suitable manner or delivered and released into the vertical supply columns of a conventional stick loader (not shown) whereupon they are inserted into the corresponding receiving openings of a conventional stickholder or stick inserter (not shown) of a frozen stick confection operation.

Although I have described in detail but one preferred embodiment which the invention may assume, it will be apparent to those skilled in the art that the invention is not so limited but that various modificaions may be made therein without departing therefrom.

What I claim is:

1. Apparatus of the character described, comprising a hopper having a discharge slot through which sticks may gravitate into a pick-up station, a delivery conveyor operating upwardly through said pick-up station, said delivery conveyor having a series of stick receiving pockets adapted to be filled each with one stick as said pockets pass through said pick-up station, a transfer device mounted on the delivery end of said delivery conveyor for receiving sticks and transferring them to a stacking trackway, a stacking trackway extending forwardly of said transfer device for receiving said sticks and supporting them in a stacked row on their edges, means including a control switch for operating said delivery conveyor, and a reciprocating carriage mounted movably on said stacking trackway, said carriage being movable forwardly by said advancing stacked row of sticks, said carriage having means for engaging said control switch to stop said delivery conveyor when said trackway becomes filled with stacked sticks, means for retracting said carriage when a supply of stacked sticks is removed from said trackway, whereby said engaging means for said control switch will be disengaged therefrom to permit said delivery conveyor to be restarted for replacing the sticks removed from said trackway.

2. Apparatus of the character described, comprising a hopper having a discharge slot through which sticks may gravitate into a pick-up station, a delivery conveyor operating upwardly through said pick-up station, said delivery conveyor having a series of stick receiving pockets adapted to be filled each with one stick as said pockets pass through said pick-up station, a transfer device mounted on the delivery end of said delivery conveyor for receiving said sticks and transferring them to a stacking trackway, a stacking trackway extending forwardly of said transfer device for receiving said sticks and supporting them in a stacked row on their edges, means including a control switch for operating said delivery conveyor, and a reciprocating carriage mounted slidably on said stacking trackway, said carriage being movable forwardly by said advancing stacked row of sticks, said carriage having means for engaging said control switch for stopping the delivery conveyor when said trackway becomes filled with stacked sticks, and means for retracting said carriage when a supply of stacked sticks is removed from said trackway, said retraction of said carriage causing said engaging means to release said control switch to permit restarting of the delivery conveyor, said trackway having guide means for engaging the tops of said stacked sticks to maintain the tops in alignment, said trackway having guide means for engaging the freely projecting ends of said sticks to maintain said ends in alignment.

3. Apparatus of the character described, comprising a hopper having a discharge slot through which sticks may gravitate into a pick-up station, a delivery conveyor operating upwardly through said pick-up station, said delivery conveyor having a series of stick receiving pockets adapted to be filled each with one stick as said pockets pass through said pick-up station, a transfer device mounted on the delivery end of said delivery conveyor for receiving said sticks and transferring them to a stacking trackway, a stacking trackway extending forwardly of said transfer device for receiving said sticks and supporting them in a stacked row on their edges, means including a control switch for operating said delivery conveyor, and a reciprocating carriage mounted slidably on said stacking trackway, said carriage being movable forwardly by said advancing stacked row of sticks, said carriage having means for engaging said control switch for stopping the delivery conveyor when said trackway becomes filled with stacked sticks, and means for retracting said carriage when a supply of stacked sticks is removed from said trackway, said retraction of said carriage causing said engaging means to release said control switch to permit restarting of the delivery conveyor, said trackway having one closed side and being tilted downwardly from the horizontal towards said closed side, said trackway having guide means for engaging the tops of said stacked sticks to maintain said tops in alignment, said trackway having guide means for engaging the freely projecting ends of said sticks to maintain their opposite ends against the closed side thereof.

References Cited by the Examiner
UNITED STATES PATENTS

| | | | |
|---|---|---|---|
| Re. 23,103 | 4/49 | Newcomer | 221—10 |
| 955,193 | 4/10 | Paulitsch | 221—236 |
| 1,263,515 | 4/18 | Biehler et al. | |
| 2,003,519 | 6/35 | Schnaier | 214—7 |
| 2,698,694 | 1/55 | Schwartz et al. | 214—7 |
| 2,745,537 | 5/56 | Cadman | 221—10 X |
| 2,954,881 | 10/60 | Hopton et al. | 214—7 X |
| 3,038,635 | 6/62 | Rasmusson | 221—253 X |

RAPHAEL M. LUPO, *Primary Examiner.*

KENNETH N. LEIMER, *Examiner.*